United States Patent [19]

Smith

[11] 4,318,877
[45] Mar. 9, 1982

[54] VIDEO DISC MOLDING PROCESS
[75] Inventor: Thomas E. Smith, Indianapolis, Ind.
[73] Assignee: RCA Corporation, New York, N.Y.
[21] Appl. No.: 108,029
[22] Filed: Dec. 28, 1979
[51] Int. Cl.³ ............................................. B29D 17/00
[52] U.S. Cl. .................................... 264/107; 264/322; 425/810
[58] Field of Search ................. 264/107, 322; 425/810
[56] References Cited
U.S. PATENT DOCUMENTS 3,526,690 9/1970 Bachman ............................ 264/107
4,213,927 7/1980 Alberti .............................. 264/107

Primary Examiner—Thomas P. Pavelko
Attorney, Agent, or Firm—B. E. Morris; H. F. VanDenburgh

[57] ABSTRACT

An improved apparatus and method of molding a high density information disc which includes maintaining the molding composition at an elevated temperature between the extrusion step and the record pressing step, such that the resultant disc is of improved quality. A heated shot cup is provided to maintain the extruded molding composition at the elevated temperature and in which the same is molded into a preform from which the disc is pressed.

3 Claims, 2 Drawing Figures

VIDEO DISC MOLDING PROCESS

This invention relates to the molding of video discs. More particularly, this invention pertains to an improved molding process and to an improved preform molding cup which provides preforms for molding video discs having improved quality and playback performance.

BACKGROUND OF THE INVENTION

In general the compression molding process for making recorded discs or records has proceeded along the following general lines: the molding composition is first thoroughly mixed and blended in a blade type mixer, as for example a Banbury mixer, from which it is fed into an extruder of the screw type. The extruder functions to mix and fuse the molding composition of plastic resinous material supplied thereto; and, thereafter, discharge the composition at a desired molding temperature in metered quantities for transport to the record or disc molding press. More particularly, a measured quantity or charge of the fused and heated molding material is caused to issue from the nozzle of the extruder into record molding apparatus, including means for receiving, forming, and holding the charge of moldable material, which means is often referred to as a "shot cup" or "forming cup". The measured quantity of molding composition which is formed and shaped by the shot cup is generally referred to as a "shot" or "preform". The forming cup is often pivotally mounted on a frame closely adjacent the extruder nozzle and is usually also adjacent to the molding press. This preform cup or mold may be so arranged as to transport the shot or preform to the molding press portion of the record molding apparatus, and thereafter deposit the charge at the proper point in the press operation cycle between the platens or pieces of the mold of the record press.

After the shot or preform has been formed, the same is then centrally placed, either automatically or manually by operator, between a pair of heated molds or press platens and an air valve is activated which closes the press platens and starts the operation of a timer controlled cycle of heating and cooling operations within the platens. The molds are closed against the preform, meeting the thermoplastic and compressing it, and causing it to flow outwardly to fill the mold cavity and define the record contour. At the end of the cycle, the press opens automatically and the disc is removed, either automatically or manually by an operator, from between the platens. At this point, the record will normally still have a ring of flash material attached to its outer edge, and this has to be removed either by hand operation or trimmed in a trimming apparatus.

In the molding of the record or disc, it is highly desirable to prevent, or at least to minimize, surface defects, such as voids, which can disrupt the grooves in the surface of the disc. In the making of high density information discs, such as video discs, the prevention of such surface defects is even more highly desirable. These discs utilize groove packing densitites on the order of 10,000 grooves per inch (3,937 per centimeter); therefore, even the smallest surface defect can disrupt a large number of the grooves.

As previously explained, the preforms from which the video discs are molded are generally formed at the extruder, and closely adjacent the molding press, in a two-part, cup-shaped mold which is generally referred to as the "shot cup" or "preform cup". The heated molding composition is injected into the preform mold through an opening therein until the cup is filled with the moldable material; forming the preform, which is then removed from the cup and placed in the record press. When the heated molding material is injected into the cup, it extrudes in a snake-like fashion across the interior of the cup until the same is filled. In this process, the molding material comes in contact with the relatively cool interior of the cup to result in the formation of a skin-like outer layer on the preform. This skin, along with other non-uniformities across the plastic material which may set-up during the uneven cooling thereof, can result in inconsistencies and variations in the density of the preform. These inconsistencies and variations adversely affect the quality of, and can result in defects in, the recorded disc made from the preform.

SUMMARY OF THE INVENTION

It has now been found in accordance with the invention and in the above-described process for making compression molded high density information discs, that if the molding composition is maintained in a heated condition between the extruder or extrusion step and the record molding press or pressing step, the resultant molded discs are of improved quality and have improved playback performance. In other words, by maintaining the shot or preform at a heated state of substantial temperature, the resultant high density information disc molded from said preform has fewer defects and inconsistencies, and is of an improved quality and has improved playback performance when compared to a similar disc made by prior art or heretofore known techniques. To accomplish the above process improvement, and in accordance with the invention, there is provided a heated shot or preform cup for maintaining the molding composition at an elevated temperature.

DETAILED DESCRIPTION OF THE INVENTION

Figure 1:
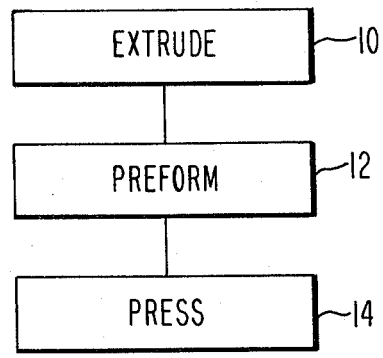
FIG. 1 is a schematic or flow diagram showing the steps in the process of making high density information discs and the environment in which the process improvement of this invention is practiced.

Referring to the drawings in detail now and in particular to FIG. 1, there is shown therein a flow diagram or schematic diagram of the process steps performed in the molding or making of recorded discs or records, particulary high density information discs hereinafter referred to as video discs. It is in this molding environment that the process improvement of this invention finds its utility such that the resultant molded video discs have improved quality and playback performance.

In the usual disc forming method, the molding composition is initially extruded 10 from the orifice of an extruder after having been thoroughly mixed in a mixer and thereafter charged to the extruder. The function of the extruder is to more thoroughly mix and fuse the molding composition into a plastic resinous material at a desired elevated temperature. Once the moldable material has obtained a proper consistency and temperature the same is charged from the extruder through an orifice in a metered quantity to a molding cup to be preformed 12. The charge is formed in the cup into the preform from which the disc is subsequently pressed. After the formation of the preform, the same is removed from the shot cup and centrally placed between a pair of heated molds in the record press, wherein the preform is pressed 14 by heat and pressure into a record or disc.

It has been found in accordance with this invention, that if the molding composition is maintained at an elevated temperature or in a heated condition throughout the entire disc forming process, and more particularly between the extrusion step 10 and the pressing step 14 of the process, the resultant disc is of improved quality and has improved playback performance. Maintaining the molding composition in a heated condition between the extruder and the heated platens of the press is attained by heating the preform mold or shot cup, which is explained in detail in connection with FIG. 2. Heating the shot cup prevents the molding composition from excessive cooling or too rapid a cooling during the preforming step 12, and prevents the formation of a skin or skin-like outer layer on the preform. The formation of a skin on the preform can lead to defects in the recorded disc pressed therefrom.

In a preferred embodiment it has been found that the optimum temperature to which the shot cup should be heated and maintained is approximately 70 percent of the temperature of the molding composition as it issues from the extruder nozzle. In a specific example that gave particularly good results, the plastic material was extruded at a temperature of 360° F. (182° C.) and the heated shot cup was maintained at a temperature of 250° F. (121° C.).

Figure 2:
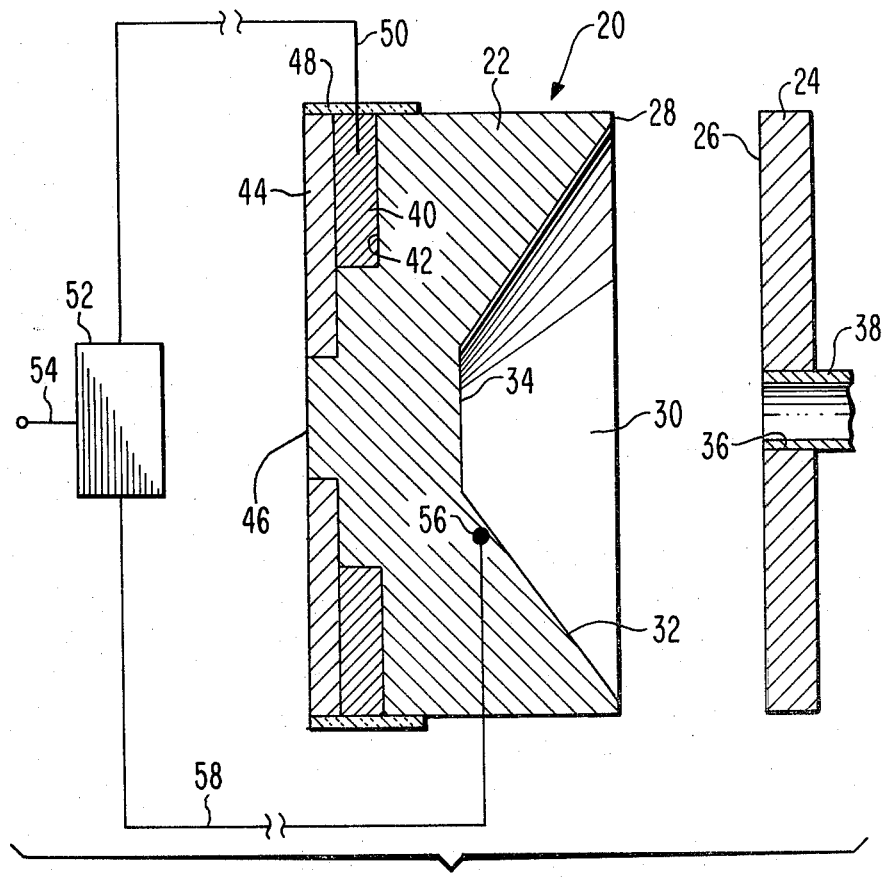
FIG. 2 is a sectional view showing the improved mold or preform cup of the present invention in open position.

With particular reference to FIG. 2, there is shown the improved preform molding cup or heated shot cup 20 of this invention. The heated shot cup 20 includes a body member 22 of generally cylindrical configuration and a cover member 24 of similar cylindrical configuration and diameter as the body member 22. Heated shot cup 20 is shown in FIG. 2 in its open position; however, when the same is in use in the forming and shaping of a preform, the cover member 24 will seal against the body member 22 with the face 26 of cover member 24 sealing against the face portion 28 of body member 22. Body member 22 of heated shot cup 20 includes a hollow or cup-like mold cavity 30, including a sloping wall portion or face 32 and a generally flat bottom portion 34 for receiving, holding, and shaping the heated molding composition into a preform. Cover member 24 of the shot cup includes an opening or orifice 36 extending axially therethrough which communicates with an orifice of the extruder (not shown) by means of an extruder nozzle 38. The heated molding composition in exiting the extruder is charged to the hollow mold cavity 30 of the shot cup through nozzle 38 and orifice 36.

The body member 22 of shot cup 20 is fabricated such as to accommodate a ring, resistance-type heater 40 extending circumferentially about the surface 42 of the body member 22. The ring heater 40 provides the heating of the shot cup 20 and is held securely in place on body member 22 by means of a clamp plate 44 extending circumferentially about body member 22 adjacent its outer surface 46. Insulation 48 intends about body member 22 covering the ring heater 40 and the clamp plate 44 is partially thermally insulate these components from the surrounding environment, as they become quite warm during operation of the heated preform cup. The ring heater 40 is energized by a pair of electrical leads 50 connected to a controller 52, which in turn is connected to a source of electrical energy (not shown) by a pair of electrical leads 54. Heated shot cup 20 is further provided with a thermocouple 56 mounted closely adjacent the face or sloping wall portion 32 of hollow or cup-like cavity 30 to sense the temperature of the cup and the preform therein. The thermocouple 56 is in turn connected to controller 52 by a pair of electrical leads 58, such that the temperature of the cup face 32 can be sensed and controlled by the controller 52 and the energizing or de-energizing of the electrical ring heater 40.

While the invention has been described with particular reference to the shot cup 20 shown in FIG. 2 and the preform molded thereby, the method of the invention is applicable to other preform and shot cup shapes and configurations. One such other preform configuration is that shown in copending U.S. Application, Ser. No. 066,769, filed Aug. 15, 1979 of McNeely, which is incorporated herein by reference.

The following Examples are included in order to illustrate the invention and the improvement thereof with greater particularity. These Examples are not intended to limit the invention in any way.

Control

This example illustrates the molding of discs by the prior art method, using the process steps set forth in FIG. 1 without the process improvement or improved preform molding cup of this invention.

In this Example a series of discs were formed following the process steps of the method illustrated in FIG. 1, without using the heated preform mold 20 of FIG. 2. For each of the discs the molding composition was blended and fused in an extruder and charged therefrom at a temperature of 360° F. (182° C.) into an unheated shot cup. The shot cup was maintained at room temperature, approximately 70° F. (21° C.) and the molding composition was formed and hardened therein to result in a preform from which the disc was made. The preform was then placed into a record press and pressed into a disc between the platens thereof which were maintained at a temperature of approximately 360° F. (182° C.).

After removal from the press, each of the discs was processed and examined both visually and by a microdefects locator to determine defects therein. By this means it was found that the average number of locked grooves per side of each disc in this series was 5.0.

EXAMPLE

This Example illustrates the improvement obtained by employing the molding process improvement and the improved preform cup of this invention.

In this Example a series of discs were formed, of approximate number as was formed in the Control, by use of the method employed in the Control, with the exception that the process improvement and the heated shot cup of this invention were included in the method.

Again, for each disc the molding composition was metered from the extruder at a temperature of 360° F. (182° C.) into a shot cup. However, in this Example the heated preform mold 20 of FIG. 2 was employed and maintained at a temperature of approximately 250° F. (121° C.) throughout the entire disc molding process. The resultant preform was molded into a disc between the heated platens of the record press at a temperature of approximately 360° F. (182° C.).

The molded disc, after having been removed from the record press, was further processed and tested for defects as in the previous example. It was found in this series of records that the average number of locked grooves per side of each disc was 2.2, which is approximately a 2:1 reduction in the number of locked grooves for the records of this Example as compared to the records of the previous Example (Control). In addition to the substantial improvement in the average number of locked grooves, there was also found to be a reduction in the visual defects in these records and a reduced carrier distress in the playback of these records when compared with the records of the previous Example (Control).

I claim:

1. In a method of making a recorded disc, including the steps of, extruding a heated molding composition from an extruder into a mold cup, forming said molding composition into a preform in said mold cup, and pressing said preform of molding composition between a pair of heated platens of a record press to form the recorded disc, the improvement comprising maintaining said molding composition at an elevated temperature between said extruding and pressing steps by employing a heated mold cup to form said molding composition into said preform, whereby the resultant recorded disc is of improved quality.

2. The method of molding a recorded disc as defined in claim 1 wherein said heated mold cup is maintained at a temperature of approximately 70 percent of the extruding temperature of said molding composition.

3. The method of molding a recorded disc as defined in claim 2 wherein said extruding temperature of said molding composition is about 360° F. (182° C.) and said heated mold cup is maintained at a temperature of about 250° F. (121° C.).

* * * * *